United States Patent [19]

Hill

[11] Patent Number: 5,052,583
[45] Date of Patent: Oct. 1, 1991

[54] METHOD AND APPARATUS FOR DISPENSING ARTICLES

[75] Inventor: Reinier Hill, Hamilton, Canada

[73] Assignee: AEC Machinery Limited, Hamilton, Canada

[21] Appl. No.: 338,114

[22] Filed: Apr. 14, 1989

[51] Int. Cl.$^5$ .................................................. B65G 59/06
[52] U.S. Cl. ............................................. 221/1; 221/84; 221/242
[58] Field of Search ................... 221/77, 82, 84, 85, 221/90, 91, 241, 242, 1

[56] References Cited

U.S. PATENT DOCUMENTS

| 984,069 | 2/1911 | Broecker . | |
|---|---|---|---|
| 1,260,578 | 3/1918 | Ravert | 221/84 |
| 1,335,221 | 3/1920 | Christensen . | |
| 1,361,294 | 12/1920 | Tschache . | |
| 2,127,217 | 8/1938 | Von Heinrich . | |
| 2,272,682 | 2/1942 | Srodulski | 221/242 |
| 2,358,292 | 9/1944 | Malhiot . | |
| 2,397,570 | 4/1946 | Smoker . | |
| 2,713,960 | 7/1955 | Siegal . | |
| 3,193,135 | 7/1965 | Bentzman | 221/77 X |
| 3,302,828 | 2/1967 | Gomez et al. | 221/84 |
| 3,339,710 | 9/1967 | Micgielse et al. . | |
| 3,842,573 | 10/1974 | Price . | |
| 4,027,458 | 6/1977 | Goodman . | |
| 4,050,218 | 9/1977 | Call . | |
| 4,426,017 | 1/1984 | Ficken et al. | 221/241 X |

Primary Examiner—F. J. Bartuska
Attorney, Agent, or Firm—Fleit, Jacobson, Cohn, Price, Holman & Stern

[57] ABSTRACT

An article dispenser is disclosed including a continuous carrier; a plurality of article engaging members formed on the carrier and regularly spaced therealong; a least two article guide members separated at a predetermined distance from one another and aligned with the carrier adjacent the article engaging members at a predetermined spacing therefrom; adjustment member for adjusting the predetermined distance and the predetermined spacing so that the article may be held between a pair of the article engaging members and leans at an angle against the article guide members for sliding movement therealong. Also disclosed is a method of dispensing articles.

5 Claims, 4 Drawing Sheets

METHOD AND APPARATUS FOR DISPENSING ARTICLES

The present invention relates to article dispensing machines.

Dispensers are well known for the major role they play in the supply and control of food and confectionery products in automatic warehousing control systems. The conventional dispenser typically has some type of conveyor with a number of paddles between which the articles are held. These conveyors are usually inclined or vertical for space reasons so that a guide wall is usually provided adjacent the paddles to prevent the articles from slipping off and jamming the conveyor. Examples of such arrangements can be seen in U.S. Pat. No. 3,302,828 to Gomez and U.S. Pat. No. 1,260,578 to Ravert.

This arrangement functions in a satisfactory manner for regularly shaped 'bulky' objects such as chocolate bars or boxes of staples, pens or the like where there is minimal risk that the article will become jammed between the paddles and the guide wall. Likewise, this arrangement is satisfactory for articles which can roll against the guide wall as they move through the dispenser. However, this arrangement is unsuitable for the dispensing of articles which are thin, are asymmetrical and resilient such as plastic container lids and the like.

It is therefore an object of the present invention to provide a novel dispensing device.

Briefly stated the invention involves an article dispenser comprising:

a continuous carrier;

a plurality of article engaging means formed on said carrier and regularly spaced therealong;

at least two article guide means separated at a predetermined distance from one another and aligned with said carrier adjacent said article engaging means at a predetermined spacing therefrom; and adjustment means for adjusting said predetermined distance and said predetermined spacing so that said article may be held between a pair of said article engaging means and leans at an angle against said at least two article guide means for sliding movement therealong.

Thus, the present invention provides a dispenser which secures the articles against movement relative to the carrier by supporting each article at one end between a pair of adjacent article engaging means and leaning the article at its other end against the two guide means. In this manner, the present invention provides an effective method of dispensing articles, particularly those having irregularly shaped surfaces, or those which are thin and flexible without the concern of the articles slipping off the carrier and jamming the dispenser.

A preferred embodiment of the present invention is illustrated in the appended drawings in which.

Figure 1:
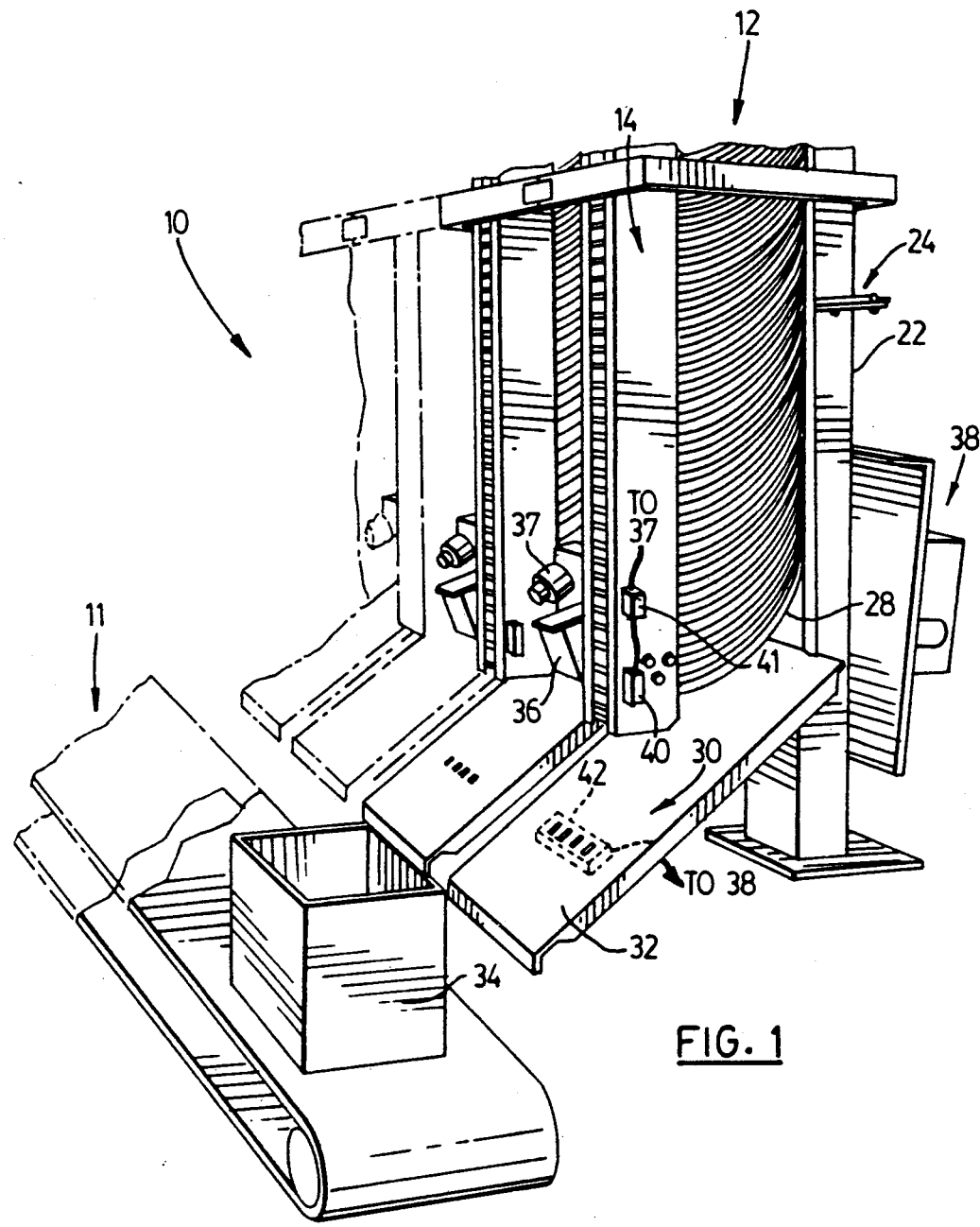
FIG. 1 is a perspective view of a dispenser array.
Figure 2:
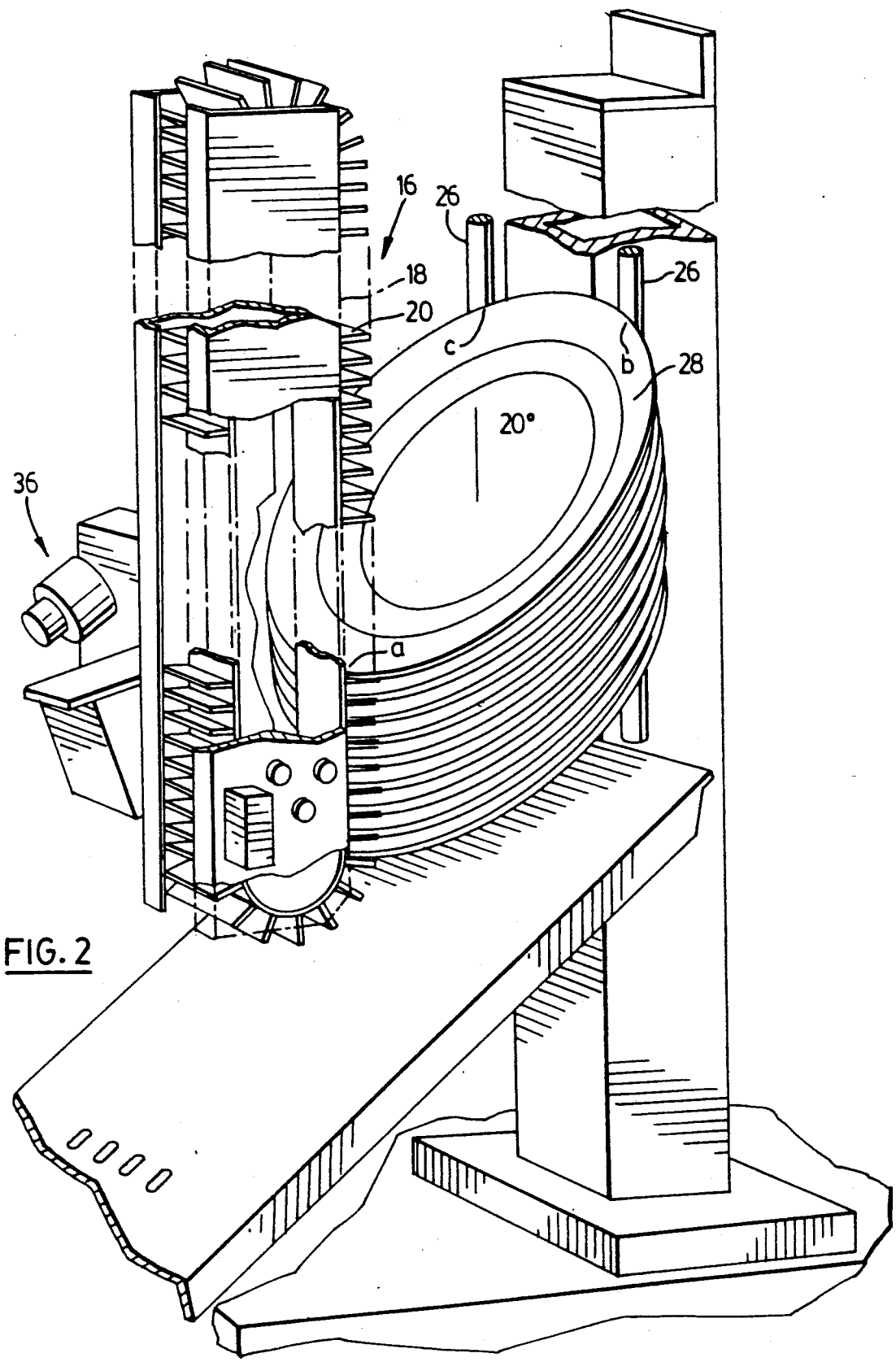
FIG. 2 is a fragmentary perspective view of one of the dispensers illustrated in FIG. 1.
Figure 4:
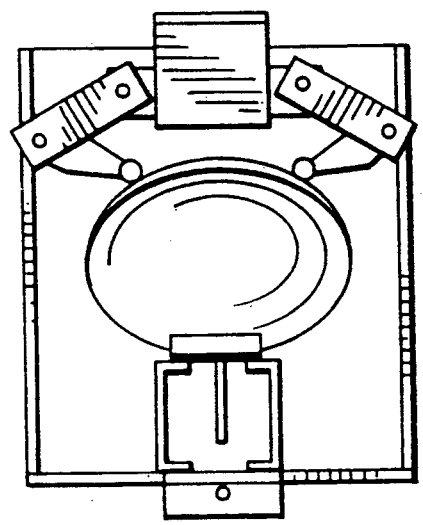
FIG. 4 is a plan view of the dispenser illustrated in FIG. 2.
Figure 5:
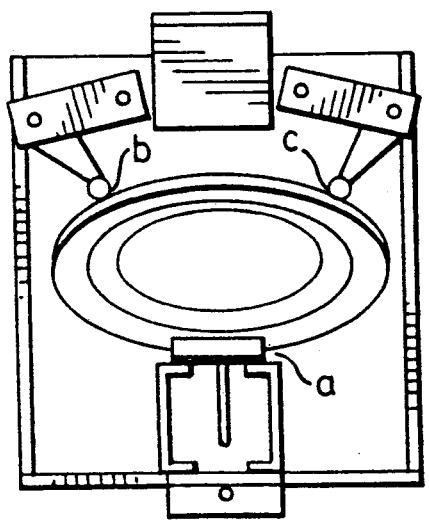

FIG. 5 is a plan view according to FIG. 4 with the dispenser in an alternative configuration Referring to the figures, there is shown a dispenser array 10 which is located alongside a horizontal tote box carrying conveyor system 11. One of the dispensers is shown in detail at 12 having a support frame 14 supporting a continuous carrier 16, best seen in FIG. 2. The carrier is in the form of a roller chain 18 upon which is mounted a plurality of cleats 20.

Figure 3:
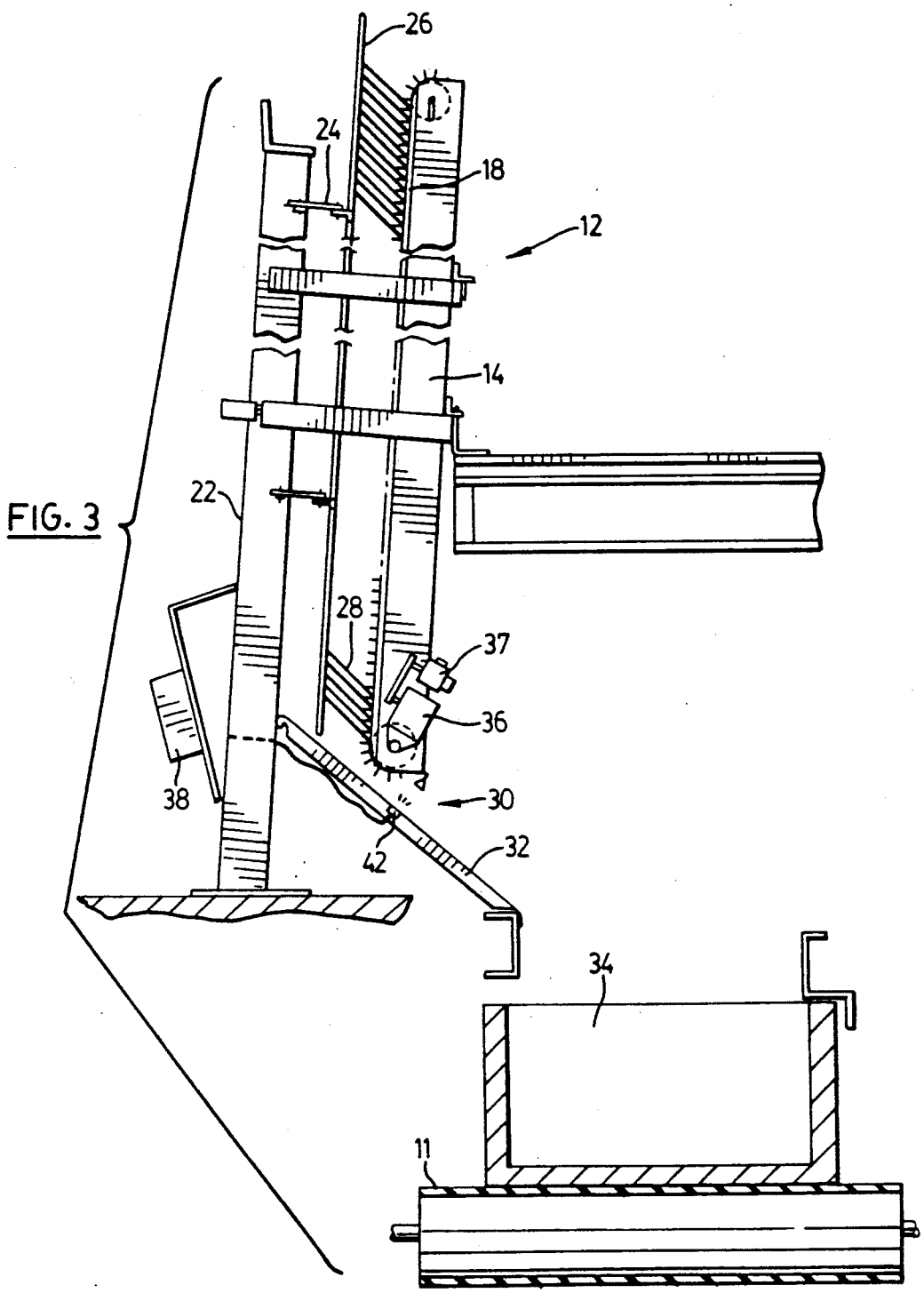
FIG. 3 is a side elevation of the dispenser array illustrated in FIG. 1.

As best seen in FIG. 3, a guide support 22 extends outwardly from the support frame 14 and has a pair of adjustable linkages 24 supporting a pair of guide rails 26. The guide rails 26 are arranged in parallel along the length of the chain 18. The adjustable linkages 24 are significant in that they allow the guide rails 26 to be adjusted relative to the chain 18 to tailor the spacing therebetween to the dimensions of the articles, shown at 28, to be dispensed and in distance relative to one another.

As seen in FIG. 3, in the upper region of the dispenser 12 the chain 18 and guide rails 26 are freely accessible to permit side loading of the dispenser 12. The dispenser 12 also has an outlet opening area 30 which is provided with a chute 32 to transfer dispensed articles 28 from the dispenser 12 to a ready tote box 34.

The chain 18 is suspended by a pair of rollers (not shown), the lower one of which is driven by an air motor 36. The motor is controlled by a solenoid operated valve 37. A controller 38 is provided to operate the motor 36 according to the number of articles 28 to be dispensed and the time at which this is to occur. A limit switch 40 is located on the support frame and adjacent the cleats 20. The limit switch 40 communicates with the solenoid operated valve 37 via a time delay unit 41 to close the valve when a successive cleat passes the limit switch 40. When this occurs, the time delay unit 41 emits a timed signal, for example three tenths of a second in duration, which closes the valve. The timed signal is provided so that the solenoid is ready for the next command from the controller. With this arrangement, the valve is opened and closed each time an article is dispensed. The dispensing of multiple articles is thus done by repeating this procedure.

The photosensor 42 communicates with the controller 38 to indicate each instance of an article being deposited into the tote box 34. The controller uses this information to keep record of the number of articles being dispensed in the tote box.

To prepare the dispenser 12 for use, the distance between the guide rails 26 and the spacing between the guide rails 26 and the chain 18 are first selected according to the dimensions of the articles 28 to be dispensed. This distance and spacing are selected by adjusting the linkages 24 so that the article will be held at one location between a pair of cleats 20 (for example at location 'a' shown in FIG. 3) and will be leaned against the guide rails 26 at two other spaced locations (for example at locations 'b' and 'c' in FIG. 3).

For optimal results, the distance and spacing should be selected so that the articles 28 will be inclined at an angle of approximately 20 degrees from vertical. The angle of inclination should not exceed 45 degrees off vertical. This ensures that the majority of the weight of the articles 28 will be carried by the cleats 20 and the chain 18. This minimizes the risk that the guide rails 26 will flex outwardly under the weight of the articles 28 which can be significant when considering the cumulative weight of possibly 60 to 100 articles 28 in a fully loaded dispenser.

By ensuring that the articles 28 lie at an angle of about 20 degrees and at most 45 degrees off vertical, the guide rails 26 and the linkages 24 may be constructed from relatively light materials and the guide support may also be light and unobtrusive to expose the chain 18, the cleats 20 and the guide rails 26 thereby allowing for easy loading and simplifying maintenance.

When the spacing is suitably selected for the articles 28 to be dispensed, the articles 28 are inserted on by one in between the cleats 20 and the guide rails 26 through either side of the dispenser 12.

When all of the articles 28 have been inserted in the dispenser 12, it is now ready for operation. As the carrying tote boxes 34 are one by one passed beneath the dispenser 12, the motor 36 is operated for a predetermined number of cycles according to the number of articles 28 that particular tote box 34 is to receive.

As the motor 36 operates, the chain 18 moves relative to the guide rails 26 causing all of the stored articles 28 to slide along the guide rails 26 in unison while remaining held between the cleats 20 and the guide rails 26.

To operate the motor 36, a command signal is conveyed by the controller to the solenoid valve 37 to operate the motor 36. The motor 36 then displaces the chain 18 to dispense an article and is then immediately stopped by the limit switch. In cases where a number of articles are dispensed, this procedure is repeated, while the controller 38 records the number of articles actually deposited in the tote box 34 using the output of the photosensor 42. If for any reason the actual number of articles dispensed is below the desired number to be dispensed, the controller retains this information and the tote box 34 carried by the conveyor system to a special checking area where the required number of articles may be added manually (or otherwise) to correct the order.

It can readily be seen that the controller 38 is easily integrated into a computerized warehousing system wherein the number of articles 28 to be dispensed and the exact time in which they are to be dispensed may be controlled by a central computer.

Should the size of the dispensed articles 28 be changed, the distance between the guide rails 26 and the spacing between the guide rails 26 and the chain 18 may be changed to accommodate the new size, as shown in FIGS. 4 and 5. Moreover, the linkages 24 permit the guide rails 26 to be separated from one another so that the contact points between the guide rails 26 and the articles 28 are farther apart to prevent the articles 28 from rolling out of the dispenser 12. This eliminates the need for side walls and greatly simplifies the construction of the dispenser 12.

A number of alternatives are envisaged for the present invention, including the use of other types of guide means including a single guide rail with outwardly extending and spaced side flanges to prevent the articles from slipping through the side of the dispenser. Any number of guide means may be provided, for example one at a location directly opposite the chain and two additional guide means located one on each side of the article near its mid-section. In addition other types of continuous carriers other than the chain 18 described herein above may be used. Other forms of engagement means other than the cleats 20 may also be utilized including paddles, arms or other members which are capable of holding the articles in place in cooperation with the guide means during travel of the articles through the dispenser.

We claim:

1. An article dispenser comprising:
   a continuous carrier;
   a plurality of article engaging means formed on said carrier and regularly spaced therealong;
   at least two article guide means separated at a predetermined distance from one another and aligned with said carrier adjacent said article engaging means at a predetermined spacing therefrom; and
   adjustment means for adjusting said predetermined distance and said predetermined spacing so that an article may be held between a pair of said article engaging means and leans at an angle against said at least two article guide means for sliding movement therealong.

2. An article dispenser as defined in claim 1 wherein said continuous carrier is a roller chain, said article engaging means including cleats secured to said chain at regular intervals therealong.

3. An article dispenser as defined in claim 2 wherein each of said article guide means includes a guide rail and a guide support frame, said adjustment means including a linkage joining said guide rail to said guide support frame.

4. An article dispenser as defined in claim 1 further comprising outlet means for delivering said articles to a receptacle, motor means for advancing said continuous carrier to dispense one of said articles through said outlet means, sensor means to sense an article dispensed through said outlet means, and a control means communicating with said motor means and said sensor means to control the number and timing of the delivery of said articles.

5. A method of dispensing articles comprising the steps of:
   providing a continuous carrier;
   providing a plurality of article engaging members on said carrier for holding said article during travel along the carrier;
   providing at least two article guiding elements in substantially parallel alignment with said carrier for guiding said articles; and
   adjusting the position of said article guiding elements according to the dimensions of said article and the spacing between said article engaging members so that when positioned on said carrier, each of said articles is held between a pair of said article engaging members and leans at an angle against said at least two article guiding elements.

* * * * *